United States Patent [19]

Ishimura et al.

[11] Patent Number: 5,490,921
[45] Date of Patent: Feb. 13, 1996

[54] TWO WATER PURIFYING, RECIRCULATING AND HEATING APPARATUS

[75] Inventors: Tadashi Ishimura; Syouji Adachi, both of Tokyo, Japan

[73] Assignee: Kioritz Corporation, Tokyo, Japan

[21] Appl. No.: 233,038

[22] Filed: Apr. 25, 1994

[30] Foreign Application Priority Data

Apr. 30, 1993 [JP] Japan .................. 5-028588 U

[51] Int. Cl.⁶ .................................. B01D 61/16
[52] U.S. Cl. ................... 210/149; 210/186; 210/195.2
[58] Field of Search .................. 210/97, 137, 138, 210/149, 181, 182, 184, 186, 194, 195.2, 258, 416.1, 416.3, 418, 651, 805; 403/10

[56] References Cited

U.S. PATENT DOCUMENTS

| | | | |
|---|---|---|---|
| 4,288,326 | 9/1981 | Keefer | 210/416.1 |
| 4,342,651 | 8/1982 | Ahrens | 210/97 |
| 4,344,826 | 8/1982 | Smith | 210/181 |
| 4,784,771 | 11/1988 | Wathen et al. | 210/195.2 |
| 5,076,913 | 12/1991 | Miller et al. | 210/195.2 |
| 5,110,468 | 5/1992 | Miyashita | 210/416.3 |
| 5,282,972 | 2/1994 | Hanna et al. | 210/195.2 |

FOREIGN PATENT DOCUMENTS 3146588  6/1983  Germany.

Primary Examiner—Joseph W. Drodge
Attorney, Agent, or Firm—Bauer & Schaffer

[57] ABSTRACT

A water purifying and heating apparatus having a pump supplying water to a purifying filter connected by conduit to a boiler and capable of being used with domestic electric power supply. The load current required for start-up of the pump is reduced, and the automatic flushing effect of the hollow fiber membrane filters is obtained as is hot water as needed, without reducing the treatment efficiency of the purifying filter even though the temperature of water being treated is low.

1 Claim, 1 Drawing Sheet

100,921

TWO WATER PURIFYING, RECIRCULATING AND HEATING APPARATUS

BACKGROUND OF THE INVENTION

This invention relates to a water purifying and heating apparatus capable of obtaining clean cold or hot water suitable for drinking or other uses and, in particular, to apparatus capable of being used as a household appliance and as industrial plant for desalting of salt water.

Heretofore, a hollow fiber membrane has been provided as water purifying filter capable of eliminating particulates. Pressure is provided to the hollow fiber member filter from the outside of the hollow fiber. Therefore, when used as a water purifying apparatus the hollow fiber membrane filter requires a pressure holding tank or the like.

In using a pressure holding tank, there is an inevitable need for a high pressure pump. Consequently, such apparatus is difficult to fabricate for use as a household appliance where 100 volt electric power is the source. In most cases, the domestic electric power source is not sufficient to provide the large load current required for start-up of the high pressure pump. Therefore, the use of such equipment is limited and portable construction virtually impossible. Further, the hollow fiber membrane has as one of its characteristics a reduction in the rate of water intake by about 50% when the temperature of water to be treated is decreased about 10° C.

SUMMARY OF THE INVENTION

The present invention is directed towards providing a water purifying and heating apparatus capable of reducing the load current required for the start-up of the pump, obtaining automatic flushing of the hollow fiber membrane used as a purifying filter, and obtaining a stable, hot water output even though the temperature of the water to be treated is low.

In order to implement the above objects, the water purifying and heating apparatus according to the present invention comprises a pump provided in the water supply conduit, a water purifying filter connected to the discharging conduit of the pump and a main conduit extending from the purified water output port of the water purifying filter and connected to a boiler unit. A secondary conduit extending from the purified water output port is divided into a soil conduit and a circulating conduit through a timer controlled cock, and a hot water supply conduit is split from a hot water outlet conduit and connected to the water supply conduit through a hot water supply cock and a flow regulator valve. The soil conduit is connected to a soil output port of the water purifying filter, and both the hot water supply cock and flow regulator valve are controlled according to water temperature at the junction of said water supply conduit and the circulating conduit so that hot water is supplied to the water supply conduit to control the temperature of the water to be supplied to the water purifying filter.

DETAILED DESCRIPTION OF THE INVENTION

Figure 1:
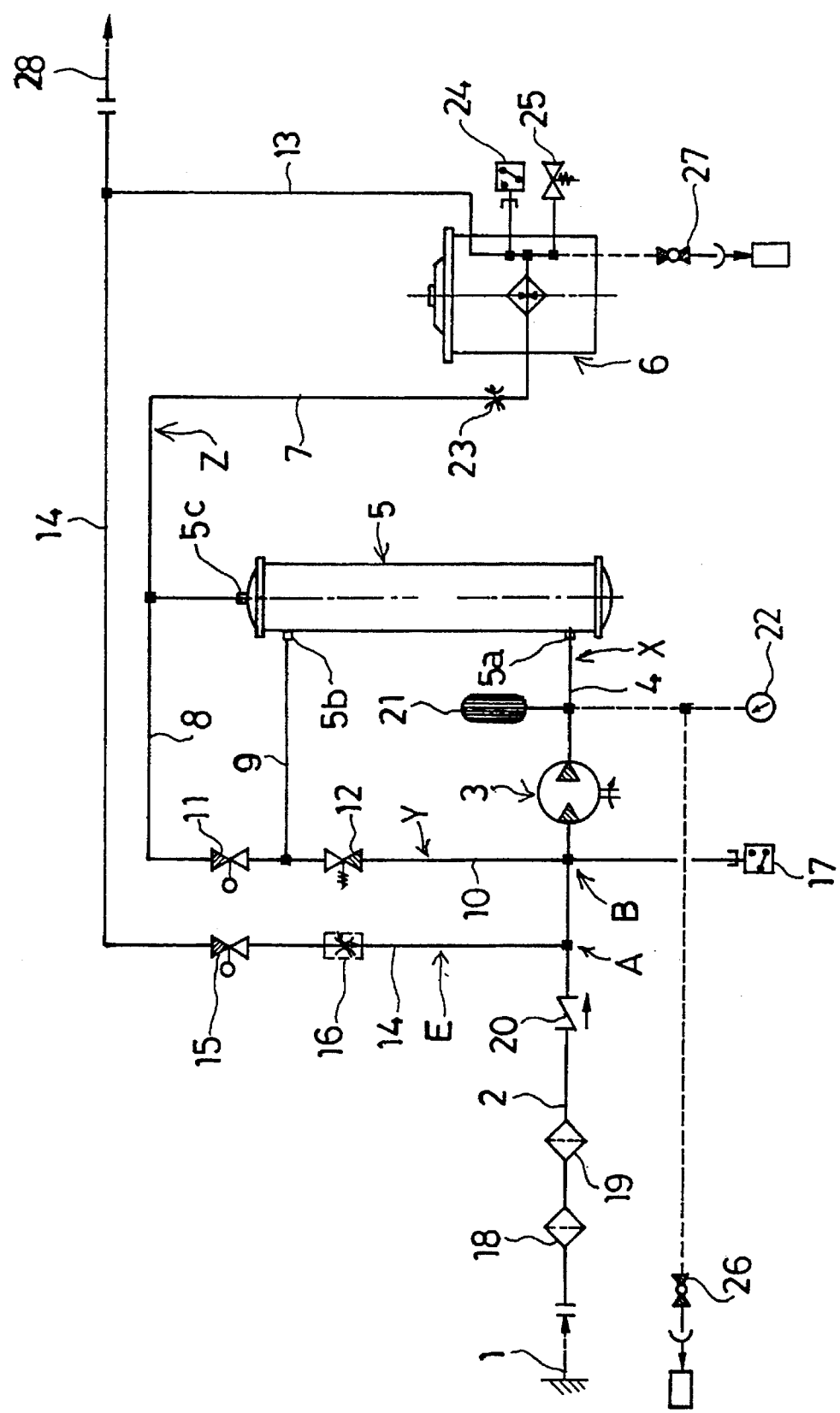
FIG. 1 is a block diagram showing the piping system of one embodiment of a water purifying and heating apparatus according to the present invention.

In FIG. 1 the numeral 1 denotes a water source such as a service water plug, for example, and the numeral 2 denotes a water supply conduit extending from the water source 1.

A pump 3, driven by a motor and the like (not shown in the drawing), is provided in the water supply conduit 2. The discharge conduit 4 of the pump 3 is connected to the water supply port 5a of a water purifying filter 5, comprising hollow fiber membrane filters.

The water purifying filter 5 is formed as a pressurized tank and has an output port 5c connected to a boiler 6 via a main conduit 7.

A secondary conduit 8 extending from the output port 5c is split into a soil conduit 9 and a circulating conduit 10 through a timer controlled cock 11. The circulating conduit 10 is connected to the water supply conduit 2 at the junction B through a regulator 12. The soil conduit 9 is connected to the soil output port 5b of the water purifying filter 5.

A hot water supply conduit 14 branches from the hot water outlet conduit 13 of the boiler 6. A hot water supply cock 15 and a flow regulator valve 16 are provided in the hot water supply conduit 14. The hot water supply conduit 14 is connected to the water supply conduit 2 at the junction A located upstream of said junction B where the water supply conduit 2 and the circulating conduit 10 join.

A thermostat 17 detecting water temperature is located at the junction B. Responsive to the valve detected by the thermostat 17, the hot water supply cock 15 opens automatically so that an appropriate volume of hot water is supplied to said water supply conduit 2 through said flow regulator valve 16 in order to control the temperature of water being supplied to the water purifying filter 5.

A pre-filter 18 is provided as is a carbon filter 19. A check valve 20, an accumulator 21, and a pressure gauge 22 are provided upstream of the filter. A pressure regulator 23, a boiler thermostat 24, a boiler vent valve 26, drains 26 and 27, and a hot water output port are associated with the boiler 5.

In the water purifying and heating apparatus according to the present invention, the cock 11, preferably electromagnetically operable, is operated by a timer (not shown in the drawing) so as to be opened for an appropriate time duration after every start-up of the pump 3.

Further, the regulator 12 is set at an appropriate working pressure so that a part (a half, for example) of the purified water exiting the water purifying filter 5 is circulated to the water supply conduit 2 while the inside of the water purifying filter 5 is maintained at the predetermined pressure.

Water to be treated is supplied to the water supply conduit 2 and passes through the pre-filter 18 so that any impurities with relatively large particle size are removed. The water then passes through the carbon filter 19 to be deodorized and finally supplied to the water purifying filter 5 by the pump 3.

Treated water coming out of the purified water output port 5c flows into the main conduit 7 and also into the circulating conduit 10 and the soil conduit 9 through the secondary conduit 8 because the timer controlled cock 11 remains opened for a certain time period after every start-up of the pump 3 as mentioned above.

Therefore, the inside of the water purifying filter 5 does not continue in its pressurized state so that the load on the pump 3 can be reduced. Thus, the water purifying and heating apparatus according to the present invention can be used as a household appliance using the domestic electric power supply of 100 volts.

Concomitantly, flushing of the water purifying filter 5 is performed because the inside of the water purifying filter 5 is maintained at lower pressure during the latter time period—that is, the water purifying filter 5 efficiently traps particulates and the like when the inside pressure is high, but it can be flush so as to discharge the trapped particulates when a large volume of water or a solution of disinfectant is added while the inside is in a state of lower pressure.

Then, when the predetermined time period has elapsed and the timer controlled cock 11 ultimately is automatically closed, the normal high pressure operation returns, and according to the efficiency of the water purifying filter 5, a portion of treated water is discharged to the main conduit 7 as purified water and the remaining portion is discharged to the soil conduit 9 as soil water (condensed water).

The purified water supplied to the main conduit 7 is supplied to the boiler unit 6 through the pressure regulator 23, where it is heated up to the temperature established at the boiler thermostat 24 and used as drinking water or shower water and the like through the hot water output port 28.

On the other hand, purified water in the secondary conduit 8 is supplied to the supply conduit 2 through the circulating conduit 10 and the regulator 12.

According to the present invention, the outlet volume of water treated at lower temperature can be increased. This is achieved by opening the hot water supply cock 15 provided in the hot water supply conduit 14, regulating the flow through the regulator valve 16 and, according to the valve detected by the thermostat 17, circulating a portion of treated water heated up in the boiler unit 6 to the supply conduit 2 so as to raise the temperature of the water supplied to the water purifying filter 5.

For example, assuming that water to be treated is supplied to the water purifying filter 5 at the rate of 20 liters per minute, water temperature at the water source 1 is 5° C. and the final water temperature at the hot water output port 28 is maintained at 40° C.

When the efficiency of the water purifying filter 5 is 50% at an appropriate temperature, the flow rate of purified water from the purified water output port 5c to the main conduit 7 is 10 liters per minute at the position Z in the drawing, while the same from the soil output port 5b of the water purifying filter 5 to the circulating conduit 10 is 10 liters per minute at the position Y in the drawing.

In order to maintain the water temperature at an appropriate temperature, for example 15° C. at the position X—that is, the water supply port 5a of the water purifying filter 5, an appropriate volume $Q_2$ of hot water can be supplied from the hot water outlet conduit 13 of the boiler unit 6 to the supply conduit 2 by controlling both the hot water supply cock 15 and the flow regulator valve 16 provided on the hot water supply conduit 14.

Assuming zero heat loss, the heat balance in the embodiment mentioned above and where water to be treated is supplied at the position X of the supply conduit 2 with soil water of 15° C. from the circulating conduit 10 at the rate of 10 liters per minute and also with purified hot water of 40° C. from the hot water supply conduit 14 at the rate of $Q_2$ during the steady operation of the apparatus is expresses as follows:

$$(20-10-Q_2) \times 5 + Q_2 \times 40 + 10 \times 15 = 20 \times 15$$

From this equation, $Q_2$ can be calculated as follows:

$35Q_2=100$ $Q_2=100/35$ $Q_2=2.86$

Therefore, even though the temperature of water to be treated is 5° C. at the water source 1, hot water of 40° C. can be obtained from the hot water output port 28 at the rate of 10−2.86=7.14 liters per minute.

Meantime, when only water of 5° C. is supplied directly from the water source 1 at the rate of 20 liters per minute, the water output from the water purifying filter 5 decreases to about half. For example, if the water at the output utilizes water at 15° C., and the temperature of water supplied to the water purifying filter 5 is 5° C., purified water flows into the main conduit 7 at the rate of 5 liters per minute and soil water flows into the soil conduit 9 at the rate of 15 liters per minute, and consequently, hot water of 40° C. can be obtained only at the rate of 5 liters per minute.

As mentioned above, the water purifying and heating apparatus according to the present invention can be used with domestic electric power supply because the water purifying and heating apparatus according to the present invention is capable of reducing the load current required for the start-up of said pump, it is possible to obtain the automatic flushing effect of the hollow fiber membrane filters and also to obtain always stable hot water outlet without reducing the treatment efficiency even though the temperature of the water to be treated is low.

What is claimed is:

1. A water purifying and heating apparatus comprising a pump, a purification filter, and a boiler;

a water supply conduit connected to an inlet of said pump, an outlet conduit from said pump to an inlet of said purification filter;

a main conduit extending from a purified water outlet of said purification filter to an inlet of said boiler;

a secondary conduit extending from said main conduit to a junction with a soil conduit extending from said purification filter and a circulation conduit, the junction being downstream of a timer controlled cock on said secondary conduit;

said circulation conduit intersecting said water supply conduit forming a second junction therewith, there being a thermostat at said second junction; and conduit means comprising a hot water supplying conduit extending from the outlet of said boiler and connected to said water supply conduit downstream of a hot water supply cock and a flow regulator valve on said hot water supplying conduit;

both said hot water supply cock and flow regulator valve being controlled according to water temperature at the junction of said water supply conduit and said circulating conduit so that hot water is supplied to said water supply conduit in order to control the temperature of water to be supplied to said purification filter.

\* \* \* \* \*

UNITED STATES PATENT AND TRADEMARK OFFICE
CERTIFICATE OF CORRECTION

PATENT NO. : 5,490,921
DATED : February 13, 1996
INVENTOR(S) : Ishimura, et. al.

It is certified that error appears in the above-indentified patent and that said Letters Patent is hereby corrected as shown below:

Title page, item [54] and col. 1, delete "TWO".

Signed and Sealed this

Fourth Day of June, 1996

Attest:

BRUCE LEHMAN

Attesting Officer

Commissioner of Patents and Trademarks